US012263645B1

(12) United States Patent
Yates

(10) Patent No.: US 12,263,645 B1
(45) Date of Patent: Apr. 1, 2025

(54) SYSTEM AND METHOD FOR A 3D PRINTER WITH ONE TIME USE FILES

(71) Applicant: Michael Yates, Mc Pherson, KS (US)

(72) Inventor: Michael Yates, Mc Pherson, KS (US)

( * ) Notice: Subject to any disclaimer, the term of this patent is extended or adjusted under 35 U.S.C. 154(b) by 453 days.

(21) Appl. No.: 17/744,431

(22) Filed: May 13, 2022

(51) Int. Cl.
*B29C 64/393* (2017.01)
*B29C 64/20* (2017.01)
*G06F 3/12* (2006.01)
*B33Y 50/02* (2015.01)

(52) U.S. Cl.
CPC ............ *B29C 64/393* (2017.08); *B29C 64/20* (2017.08); *G06F 3/1222* (2013.01); *G06F 3/1238* (2013.01); *B33Y 50/02* (2014.12); *G06F 3/1284* (2013.01)

(58) Field of Classification Search
None
See application file for complete search history.

(56) References Cited

U.S. PATENT DOCUMENTS

| 7,141,207 | B2 | 11/2006 | Jandeska, Jr. et al. | |
|---|---|---|---|---|
| 10,406,758 | B2* | 9/2019 | Lacaze | B33Y 40/00 |
| 2006/0244995 | A1* | 11/2006 | Kushida | G06F 3/1207 |
| | | | | 358/1.15 |
| 2014/0223583 | A1* | 8/2014 | Wegner | G06F 3/1212 |
| | | | | 700/98 |
| 2015/0073890 | A1* | 3/2015 | Nobutani | G06F 3/1236 |
| | | | | 358/1.14 |
| 2016/0167308 | A1* | 6/2016 | Glasgow | B29C 64/386 |
| | | | | 700/98 |
| 2017/0068490 | A1* | 3/2017 | Viswanathan | G06F 3/1204 |
| 2020/0104080 | A1* | 4/2020 | Maruyama | G06F 3/1238 |
| 2021/0103270 | A1* | 4/2021 | Mohammad | G06F 3/1288 |
| 2021/0191364 | A1* | 6/2021 | Dubov | G06F 30/12 |
| 2021/0224361 | A1* | 7/2021 | Veldsman | B29C 64/393 |
| 2022/0203617 | A1* | 6/2022 | Pekic | B29C 64/30 |

* cited by examiner

*Primary Examiner* — Akwasi M Sarpong
*Assistant Examiner* — Pawan Dhingra
(74) *Attorney, Agent, or Firm* — Sanchelima & Associates, P.A.; Jesus Sanchelima; Christian Sanchelima

(57) ABSTRACT

A system and method for a 3D printer with one time use files that incorporates a software and a 3D printer to perform the method. In a first phase the software is used to configure a machine ID number, a file ID number and create an OBJ file and a number of prints for the OBJ file in a modified OBJ file. In a second phase the modified OBJ file is encrypted to a G file. In a third phase the G file is introduced to the 3D printer. The 3D printer validates the machine ID number and the file ID number of the G file. In a fourth phase the 3D printer prints a design contained in the G file the predetermined number of times that G file indicates. The 3D printer stores the file ID number to prevent the G file being printed again.

1 Claim, 2 Drawing Sheets

SYSTEM AND METHOD FOR A 3D PRINTER WITH ONE TIME USE FILES

II. BACKGROUND OF THE INVENTION

1. Field of the Invention

Figure 1:
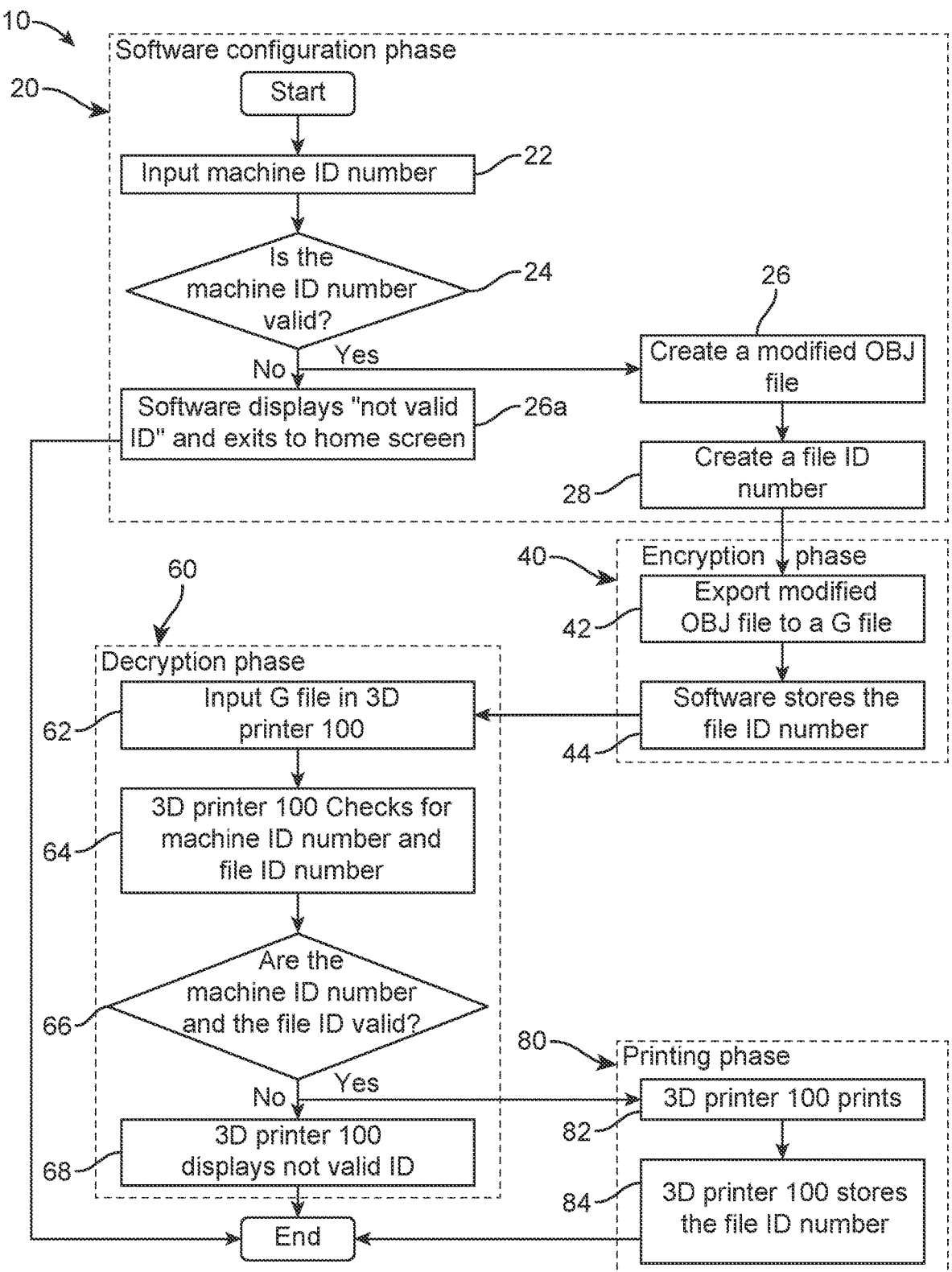

The present invention relates to a system and method for a 3D printer with one time use files and, more particularly, to a system and method for a 3D printer with one time use files that allows to configure an OBJ file to be printed a predetermined number of times, being this obj file unmodifiable after configuration.

2. Description of the Related Art

Several designs for systems and methods for 3D printers with one time use files have been designed in the past. None of them, however, include a 3D printer that tracks the amount of filament remaining in the 3D printer to prevent failure of one-time printing.

Applicant believes that a related reference corresponds to U.S. Pat. No. 7,141,207 issued for a 3D printing, rapid prototyping system that uses metal coated particles. Applicant believes that another related reference corresponds to U.S. Pat. No. 10,406,758 issued for a method for printing 3D parts which can be filled with an additional material such as carbon fiber. None of these references, however, teach of an encrypted 3D printing method and system that is comprised of a 3D printer that is capable of printing metallic or carbon fiber 3D objects where the 3D printer uses an encrypted object file that is authorized for a single use on the designated 3D printer as to prevent unauthorized reproduction of the object.

Other documents describing the closest subject matter provide for a number of more or less complicated features that fail to solve the problem in an efficient and economical way. None of these patents suggest the novel features of the present invention.

III. SUMMARY OF THE INVENTION

It is one of the objects of the present invention to provide a system and method for a 3D printer with one time use files that includes a 3D printer that has a 3D printer ID number to identify if an OBJ file is intended to be used in that 3D printer and deny access if not.

It is another object of this invention to provide a system and method for a 3D printer with one time use files that allows to create an OBJ file that includes a file ID number and a predetermined number of times the OBJ file can be printed in a predetermined 3D printer, whit the 3D printer selectively validating OBJ files.

It is still another object of the present invention to provide a system and method for a 3D printer with one time use files that includes a 3D printer that stores the information of the OBJ files introduced therein to do not authorize to print the OBJ file more that the predetermined number of times the OBJ file is programed to print.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

IV. BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 represents a flow chart for a method 10 containing a software configuration phase 20, an encryption phase 40, a decryption phase 60 and a printing phase 80. Method 10 uses a 3D printer 100.

Figure 2:
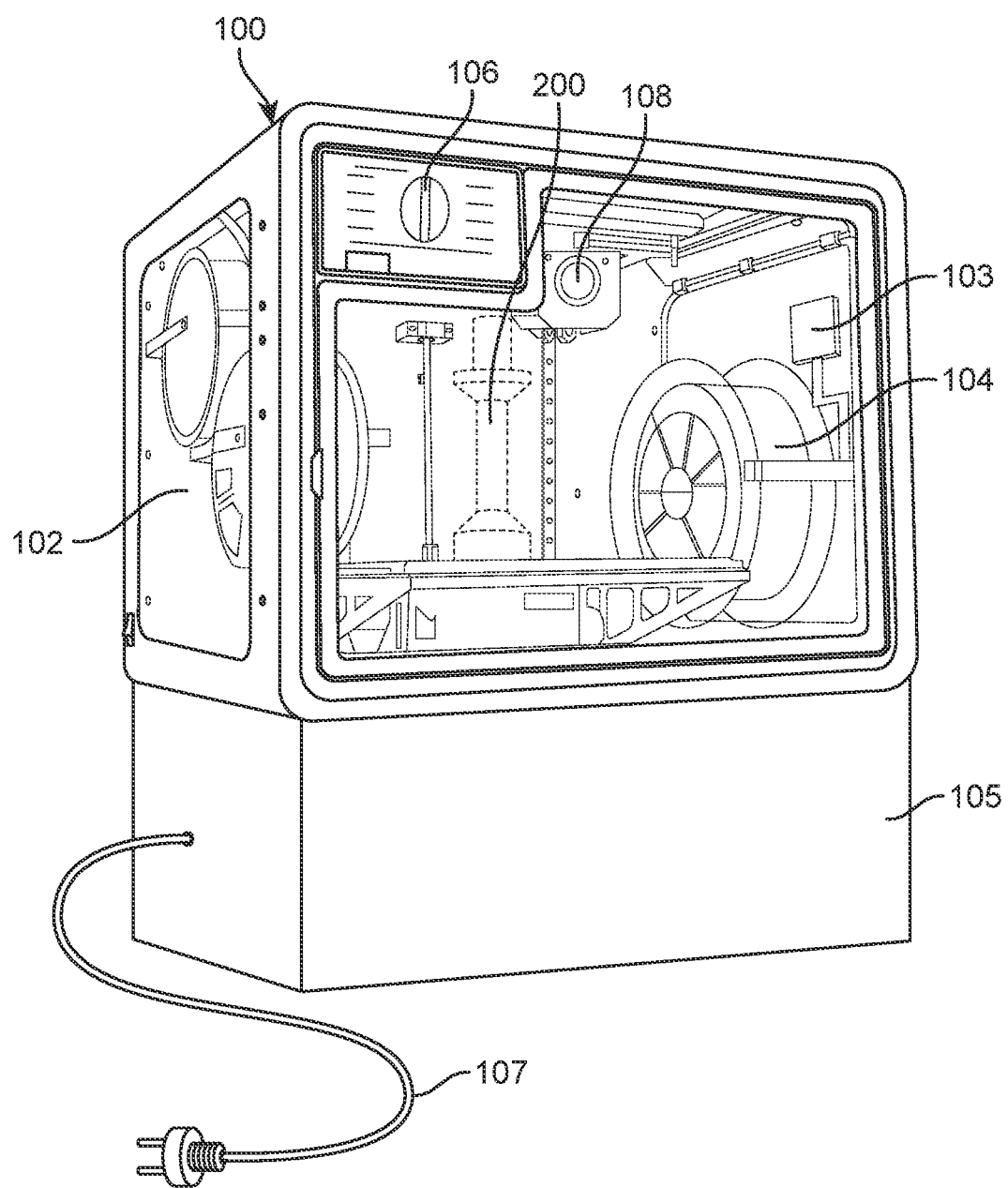

FIG. 2 shows an isometric operational view of the 3D printer 100 having a 3D printed object 200 therein.

V. DETAILED DESCRIPTION OF THE EMBODIMENTS OF THE INVENTION

Referring now to the drawings, where the present invention is generally referred to with numeral 10, it can be observed that it basically includes containing a software configuration phase 20, an encryption phase 40, a decryption phase 60 and a printing phase 80. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The software configuration phase 20 may include a first step 22, a second step 24, a third step 26 and a fourth step 28. Method 10 may use a software and a 3D printer 100. The software may be used to create a secured one-time-printing which includes an OBJ file. A G-file is known in the prior art as being a file that contains computer numeric control code used to control automated machine tools in 3D computer-aided manufacturing applications. An OBJ file is known in the prior art as being a 3D image format that includes 3D coordinate, texture maps, polygonal faces, and other object information. The configuration phase 20 may be used to configure and code the G file including information such as all the details of the object, control, number of pieces to be printed, set a unique file's ID number, and store the machine ID number.

The first step 22 may be input machine ID number. The machine ID number may be a unique and predetermined number which each 3D printer 100 is assigned to. The first step 22 may be used to set a machine ID number to identify a single predetermined machine on which the OBJ file can be 3D-printed. In the second step 24 the software may check that the machine ID number is valid. If the machine ID number is not valid the software may display "not valid ID and exits to home screen 26a. A valid machine ID number may be a sixteen-digit ID. If the machine ID number is valid the software may proceed to the third step 26. In the third step 26 the software may create a modified OBJ file which includes the machine ID number, an OBJ file for the figure, the number of times the OBJ file can be printed, and additional details of the figure to be 3D printed. In a fourth step 28 the software may create a file ID number. After assigning the software ID number the software may send an email or a notification with the file ID number to the user that created the file. It also may be suitable for the software to be connected to a display to show the file ID number. By this point the modified OBJ may be created and then it must be encrypted to be a single G-file.

The encryption phase 40 may include a fifth step 42 and a sixth step 44. The encryption phase 40 may encrypt the modified OBJ file that includes OBJ file information, the machine ID number, the file ID number, the number of times the file can be printed or any other suitable information into a single G-file. The fifth step 42 may be exporting the modified OBJ file to a G file. The G-file may include specifications for printing a 3D figure a predetermined number of times. The G-file may be a one-time use file which will be invalid after use. The G file may be used only in a predetermined computer which was assigned by the machine ID number in the software configuration phase. The G-file may be exported to a USB flash drive or any other storage device. After exporting the G-file the software may store the file's ID number in a sixth step 44. Storing the file's ID number in the software may allow the software to not use the same file ID number or modify the G-file. Thus, after the encryption phase 40, the G-file exported may not be modified and may be secured to be used only in the predetermined 3D printer set in the first step 22 a single time to print a predetermined number of 3D objects.

The decryption phase 60 may include a seventh step 62, an eight step 64 and a ninth step 66. In the decryption phase 60 the G-file, which is a snap print G-file may be introduced in the 3D printer 100. The 3D printer 100 may be a device to create 3D objects 200 using the G-file. It may be suitable for the 3D printer 100 to include the software for creating G-files, the software may also allow decryption, reading, and use of the G-file. It also may be suitable for the 3D printer 100 to include an additional software to decrypt, read and use the G-file.

The 3D printer 100 may include a display screen 106, a print head 108, filament 104, a filament tracker 103, a housing 102, a control system 105 and a power cord 107. The 3D printer 100 may be a dual-extruder printer for Polylactic acid (PLA), Acrylonitrile butadiene styrene (ABS) and carbon fiber filament or a dual-extruder printer with the capability of printing in aluminum, PLA, ABS, and carbon fiber filament. It also may be suitable for the 3D printer 100 to print any other suitable material. The display screen 106 may display detailed information of the G-File. It may be suitable for the display screen 106 to be used for operating the 3D printer. The Filament 104 may be used to make the objects 200. The filament tracker 103 may be used to indicate how much filament 104 is left. The print head 108 may use the filament 104 to print 3D objects 200. The control system 105 may be used to process the indications that the G-file contains and control the print head 108. The housing 102 may protect the components of the 3D printer 100. The power cord 107 may be used to provide power to the 3D printer 100.

The seventh step 62 may be input the G-file in a 3D printer 100. In the seventh step 62 the user may be asked for the file ID number. It also may be suitable in the seventh step 62 for the 3D printer 100 to read the file ID number from the G-file. In an eight step 64 the 3D printer 100 may search in the G-file for the machine ID number and for the file ID number. In the ninth step 66 the 3D printer 100 may check for a valid machine ID number and for a valid ID number. For a valid machine ID number, the ID number may be the same as the 3D printer ID number 100 being used. The 3D printer ID number may be a predetermined 16-digit ID number which is assigned and different for each 3D printer 100. A valid file ID number may be a 16-digit number which has never been used in the 3D printer 100. If the machine ID number and the file ID number is valid the 3D printer 100 prints. If the machine ID number or the file ID number are not valid, then the 3D printer 100 displays "not valid ID" and exits. If the machine ID number or the file ID number are not valid, then the G-file may be disable of be used again.

The printing phase 80 may include a tenth step 82 and an eleventh step 84. In the tenth step 82 the 3D printer 100 prints. The 3D printer 100 may print the file the number of times indicated in the G-file. The 3D printer 100 may store information of the number of times that the G-file printed. The G-file may contain duplicated OBJ files. The duplicated OBJ files may be the same number of OBJ files that the G-file was coded to print. The 3D printer 100 may print in order each of said OBJ files into the G-File. The 3D printer 100 may delete the OBJ files of the objects that have been already printed. The eleventh step 82 may be for the 3D printer 100 to store the unique file's ID number. In a preferred embodiment the file ID number of the G-file may be stored in the 3D printer to disable said file ID number to be used again. In a preferred embodiment the software configurates a modified OBJ file containing a machine ID number and a file ID number in a software configuration phase 20 and if the machine ID number and the file ID number is valid the modified OBJ file is exported to a G-file in the encryption phase 40, then the G-file may be inserted in the 3D printer 100 and the 3D printer 100 may check for a valid machine ID number and a file ID number in the decryption phase 60, if the machine ID number and the file ID number are valid the 3D printer 100 may print in the printing phase, after printing the G-file cannot be used again.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system and method for a 3D printer with one time use files, consisting of:
   configuring a software to set a machine ID number, a file ID number, an OBJ file to be printed and a predetermined number of times that said OBJ is printed into a modified OBJ file, said machine ID number is a predetermined unique ID number for said 3D printer, said file ID number is a unique file ID number, said machine ID number is a sixteen-ID number, said file ID number is a sixteen-ID number assigned to said G-file, said unique sixteen-ID number is configured to be used only once for said G-file;
   encrypting said modified OBJ file to a snap print G file, said snap print G file is configured to be used once in said 3D printer to print said predetermined number of times said OBJ file;
   inputting said snap print G file in said 3D printer, wherein said 3D printer validates said machine ID number and said file ID number, said 3D printer is configured to check for said machine ID to have an extension of sixteen digits, said 3D printer validates that said file ID number has not been used before in said 3D printer, said 3D printer uses said software to validate and process said G-file; and
   printing a design contained in said snap print G file said predetermined number of times in said 3D printer, said 3D printer is configured to store said file ID number of said snap print G file to prevent said snap print G file to be used again, said 3D printer is configured to use filament to print, said 3D printer has a track filament to track the amount of said filament left, said filament is aluminum filament, polylactic acid filament, acrylonitrile butadiene styrene filament or carbon fiber filament.

\* \* \* \* \*